United States Patent [19]
Yasunami

[11] Patent Number: 6,155,138
[45] Date of Patent: Dec. 5, 2000

[54] STRUCTURE OF HYDRAULIC CIRCUIT FOR AUTOMATIC TRANSMISSION

[75] Inventor: Masahiro Yasunami, Tokyo, Japan

[73] Assignee: Fuji Jokogyo Kabushiki Kaisha, Tokyo, Japan

[21] Appl. No.: 09/336,478

[22] Filed: Jun. 18, 1999

[30] Foreign Application Priority Data

Jun. 24, 1998 [JP] Japan .................................. 10-177759

[51] Int. Cl.[7] ................................................. F16H 15/00
[52] U.S. Cl. ........................................................ 74/606 R
[58] Field of Search ........................................... 74/606 R

[56] References Cited

U.S. PATENT DOCUMENTS

| | | | |
|---|---|---|---|
| 4,210,034 | 7/1980 | Younger | 74/606 R |
| 4,738,159 | 4/1988 | Kato et al. | 74/606 R |
| 4,950,213 | 8/1990 | Morisawa | 74/606 R X |

FOREIGN PATENT DOCUMENTS 8177890  7/1996  Japan .

Primary Examiner—Rodney H. Bonck
Assistant Examiner—Saúl Rodríguez
Attorney, Agent, or Firm—Martin A. Farber

[57] ABSTRACT

A pump fluid passage communicating with an oil pump is formed in main case of a transmission case. Further, a primary fluid passage for supplying a hydraulic pressure to a primary pulley is formed in a wall member of a side case of the transmission case. Further, a line fluid passage for supplying a line pressure to a secondary pulley is formed in a wall member of the side case of the transmission case. Further, a communicating fluid passage is formed in a control valve body. When the control valve body is mounted on the bottom surfaces of the main case and the side case, the control valve body closes the bottom open surfaces of the main case and the side case and at the same time the communicating fluid passage connects the pump fluid passage with the primary fluid passage and the line fluid passage, respectively.

3 Claims, 2 Drawing Sheets

STRUCTURE OF HYDRAULIC CIRCUIT FOR AUTOMATIC TRANSMISSION

BACKGROUND OF THE INVENTION

1. Field of the Invention

The present invention relates to a structure of a hydraulic circuit for an automatic transmission and more particularly to a hydraulic circuit for an automatic transmission in which a communicating passage formed in a control valve body communicates between fluid passages provided in a transmission case.

2. Prior Art

Generally, as disclosed in Japanese Patent Application Laid-open No. Toku-Kai-Hei 8-177890, a hydraulic circuit of a continuously variable transmission is formed such that a hydraulic pressure generated by an oil pump provided in a transmission case is supplied to hydraulic actuating chambers such as a primary pulley actuating chamber, a secondary pulley actuating chamber and the like through fluid passages provided in the transmission case.

In most cases, the transmission case is divided into a main case and a subsidiary case for the sake of assembly convenience. Therefore, in this case, in order to communicate between the main case and the subsidiary case with a fluid passage, a dedicated conduit such as a lubrication pipe must be installed therebetween.

However, it is not so easy to provide such a dedicated pipe in a narrow transmission case. Further, since the location suitable for connecting the pipe to the transmission case is limited, the configuration of fluid passages formed in the transmission case becomes complicated. Such complicated fluid passages are difficult to be cast. Further, it is not realistic to make such complicated fluid passages by machining.

Furthermore, the forgoing lubrication pipe needs an additional man-hour for installation and the number of components increases.

SUMMARY OF THE INVENTION

It is an object of the present invention to provide a hydraulic circuit structure of an automatic transmission which enables to connect both fluid passages provided in the main case and the subsidiary case of the transmission case with a simple communicating passage.

In order to achieve the object, the hydraulic circuit structure comprises a control valve body including a control valve therein and mounted on a common mating surface formed by bottom surfaces of a main case and a subsidiary case so as to close the bottom surfaces thereof and a communicating fluid passage formed in the control valve body for communicating between a fluid passage of the main case and a fluid passage of the subsidiary case.

DETAILED DESCRIPTION OF THE INVENTION

Figure 1:
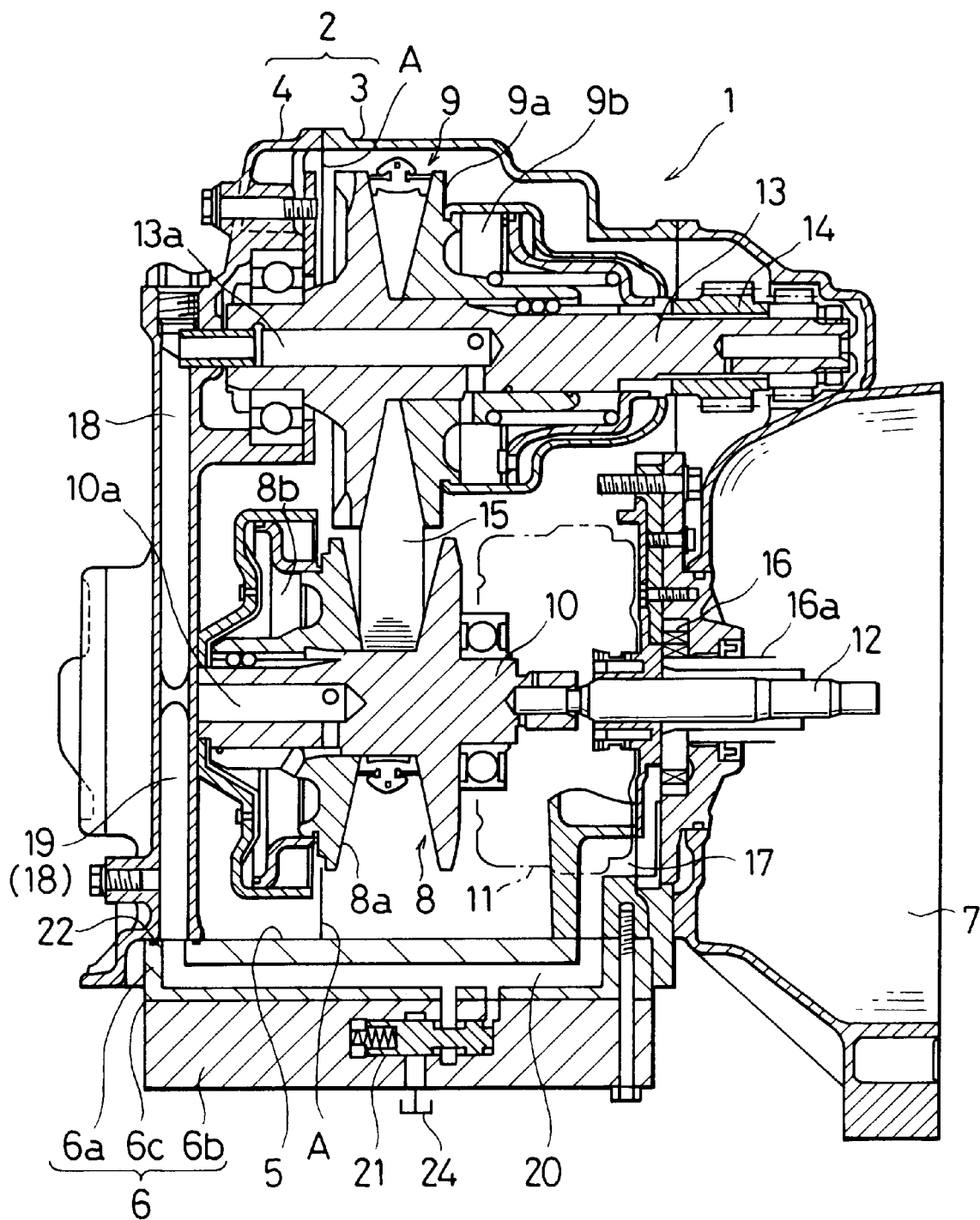
FIG. 1 is a cross sectional view of a continuously variable automatic transmission.
Figure 2:
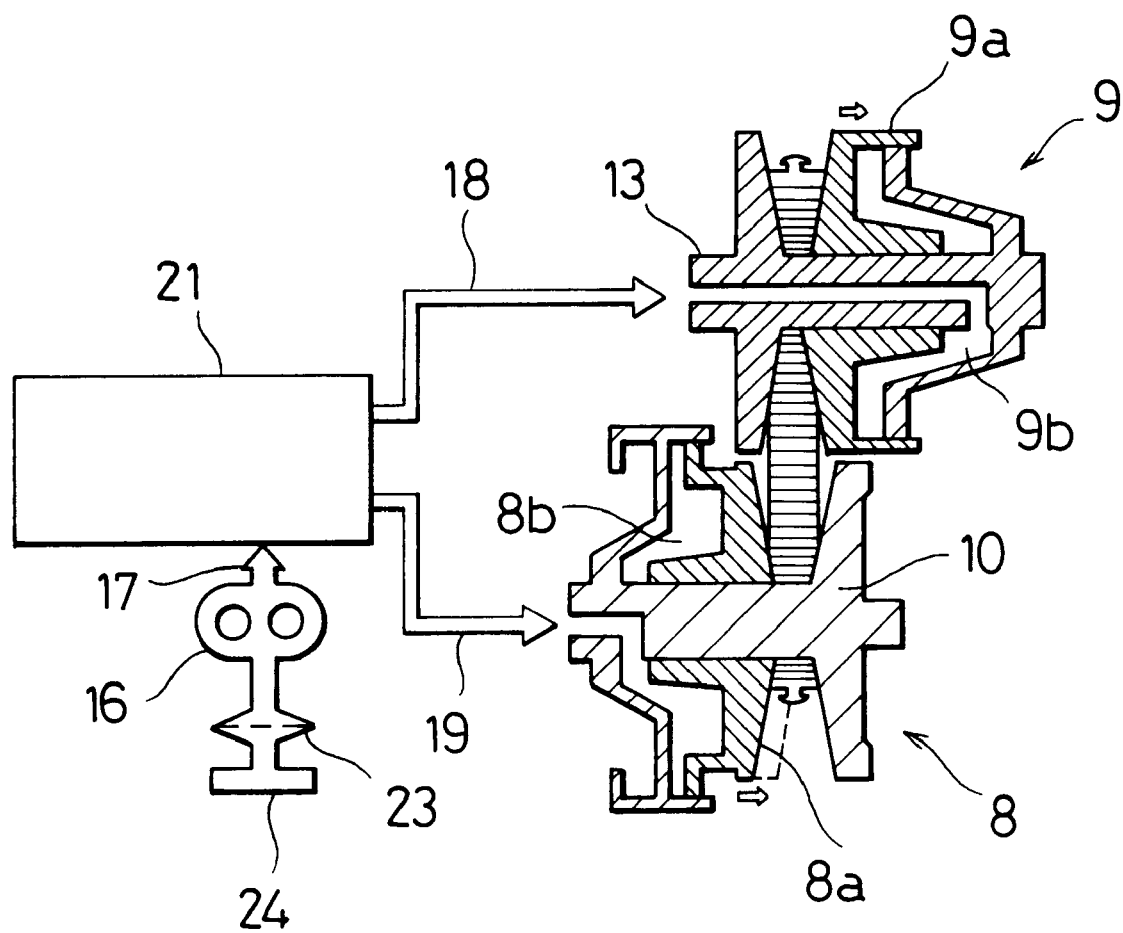
FIG. 2 is a schematic view of a hydraulic circuit of a continuously variable transmission.

Referring now to FIG. 1, reference numeral 1 denotes a continuously variable transmission and reference numeral 2 denotes a transmission case for housing the continuously variable transmission 1. The transmission case 2 is divided into a main case 3 and a side case 4 at a mating surface A. The main case 3 and the side case 4 are connected at the bottom surface thereof with a control valve body 6 through a common mating surface 5.

Further, the main case 3 is connected at an opposite side of the side case 4 with a torque converter case 7.

In the transmission case 2, a primary pulley 8 and a secondary pulley 9 are disposed in parallel with each other. A primary pulley shaft 10 supporting the primary pulley 8 is connected at an end thereof with a pulley input shaft 12 projected into the torque converter case 7 through a forward and reverse changeover apparatus 11.

Further, a secondary pulley shaft 13 supporting the secondary pulley 9 is coupled at an end thereof to a reduction drive gear 14 engaged with a final reduction gear unit (not shown).

Further, a moving sheave 8a is mounted on the primary pulley shaft 10 at an opposite side of the pulley input shaft 12. The moving sheave 8a is moved axially by a hydraulic pressure introduced into a primary pulley actuating chamber 8b.

Further, a moving sheave 9a is mounted on the secondary pulley shaft 13 at the side of the reduction gear 14. The moving sheave 9a is moved axially by a hydraulic pressure introduced into a secondary pulley actuating chamber 9b. Both pulleys 8, 9 are interconnected with each other by a belt 15. When the hydraulic pressure in the primary pulley actuating chamber 8b varies, the moving sheave 8a is moved axially so as to vary the winding diameter of the belt 15 of the primary pulley 8. At this time, the winding diameter of the secondary pulley 9 varies in a reverse proportion to that of the primary pulley 8.

An oil pump 16 is disposed between the torque converter case 7 and the main case 3. The oil pump 16 is driven by a pump drive shaft 16 which is connected with a pump impeller of a torque converter (not shown). Further, the pulley input shaft 12 is connected with a turbine (not shown) of the torque converter.

A pump fluid passage 17 communicating with the oil pump 16 is formed in the main case 3 of the transmission case 2. Further, a line fluid passage 18 and a primary fluid passage 19 are formed in the wall member of the side case 4.

The line fluid passage 18 communicates with the secondary pulley actuating chamber 9b of the secondary pulley 9 through a fluid passage 13a provided in the secondary pulley shaft 13 and the primary fluid passage 19 communicates with the primary pulley actuating chamber 8b of the secondary pulley 8 through a fluid passage 10a provided in the primary pulley shaft 10.

The fluid passages 17, 18 and 19 communicate with the control valve body 6 through respective holes (not shown) provided on the mating surface 5. The control valve body 6 comprises an upper valve body 6a, a lower valve body 6b and a separator 6c.

A communicating fluid passage 20 is provided in the upper valve body 6a of the control valve body 6. The communicating fluid passage 20 communicates with the pump fluid passage 17 upstream thereof and branches into a plurality of fluid passages. The branched communicating fluid passages 20 further communicate with the line fluid passage 18, the primary fluid passage 19 and other fluid passages which are formed in the side case 4, respectively.

Further, the lower valve body 6b accommodates therein miscellaneous control valves 21 such as a regulator valve for regulating a hydraulic pressure supplied to the line fluid passage 18 so as to maintain a clamping force necessary for torque transmission to the secondary pulley 9, a shift control valve for regulating a hydraulic pressure supplied to the primary fluid passage 19 so as to vary the winding diameters of both pulleys 8, 9, and the like.

In this embodiment, for example, the regulator valve communicates with the communicating fluid passage 20 connected to the line fluid passage 18 and the shift control valve communicates with the communicating fluid passage 20 connected only to the primary fluid passage 19.

Further, an O-ring 22 is interposed around the respective holes of the line fluid passage 18 and the primary fluid passage 19 at the mating surface 5. Since when the main case 3 is connected at the bottom surface thereof with the upper valve body 6*a*, the mating surface 5 between the main case 3 and the upper valve body 6*a* forms a reference plane, a sink is produced between the side case 4 and the upper valve body 6*a* when assembled. The O-ring 22 is provided for the purpose of absorbing the sink. In the drawing, reference numeral 23 denotes an oil strainer and reference numeral 24 denotes an oil pan.

When assembling the continuously variable transmission 1, first the primary pulley 8 and the secondary pulley 9 are mounted on the side case 4 of the transmission case 2 and then the side case 4 is fastened to the main case 3 by bolts (not shown). After that, the forward and reverse changeover apparatus 11, the oil pump 16 and other surrounding components are accommodated into the main case 3. The torque converter case 7 is fastened to the main case 3 by bolts (not shown). The oil pump 16 is connected with the pump impeller of the torque converter accommodated in the torque converter case 7 through the oil pump drive shaft 16*a*.

Further, the control valve body 6*a* abuts against the common mating surface formed by the bottom surfaces of the main case 3 and the side case 4 and is fastened by bolts. Thus, the fluid passage 17 on the main case 3 side communicates with the respective fluid passages 18, 19 on the side case 4 side through the communicating fluid passage 20 formed in the upper valve body 6*a* of the control valve body 6.

Since the upper valve body 6*a* mates with the transmission case 2 in such a way that the bottom surface of the main case 3 is a reference plane, the O-ring 22 serves as absorbing a sink produced between the side case 4 and the upper valve body 6*a*. Because of this, the mating surface 5 between the both cases 3, 4 and the upper valve body 6*a* is not necessary to have a tight tolerance in adjusting the height of the bottom surfaces of the cases 3, 4, nor machining after assembly is necessary.

Further, since the pump fluid passage 17 provided in the main case 3 communicate with the fluid passages 18, 19 provided in the side case 4 through the communicating fluid passage 20 provided in the control valve body 6, all fluid passages needed for actuating the primary and secondary pulleys or for lubricating miscellaneous transmission components can be accommodated in the wall member of the transmission case 2 without using any special pipe member.

Next, the assembled continuously variable transmission 1 is connected with the engine (not shown) through the torque converter. Thus, the pulley input shaft 12 connected to the primary pulley shaft 10 of the primary pulley is spline-fitted to the turbine of the torque converter. Further, the oil pump 16 is connected through the oil pump drive shaft 16*a* with the pump impeller of the torque converter.

Further, when an engine operates, the engine drives the pulley input shaft 12 through the pump impeller and the turbine of the torque converter. At this time, the oil pump 16 is also driven by the pump impeller to suck working fluid through an oil strainer 23 from an oil pan 24 and to generate a hydraulic pressure downstream of the oil pump 16.

The hydraulic pressure generated by the oil pump 16 is fed to the fluid passage 20 formed in the upper valve body 6*a* of the control valve body 6 through the pump fluid passage 17 formed in the main case 3 of the transmission case 2.

The hydraulic pressure is diverted from the communicating fluid passage 20 into a plurality of fluid passages provided in the upper valve body 6*a* and is regulated at a predetermined value by the control valves 21 such as a regulator valve, a shift control valve and the like respectively. The hydraulic pressure regulated by each control valve 21 is sent to the line fluid passage 18, the primary fluid passage 19 and the like.

The hydraulic pressure (line pressure) sent to the line fluid passage 18 is supplied to the secondary pulley actuating chamber 9*b* of the secondary pulley 9 to apply a clamping force necessary for torque transmission to the secondary pulley. On the other hand, the hydraulic pressure (primary pressure) sent to the primary fluid passage 19 is supplied to the primary pulley actuating chamber 8*b*. In the relationship between the primary pressure and the line pressure, the respective moving sheaves 8*a*, 9*a* operate to vary the winding diameter of the respective pulleys 8, 9 in reverse proportion, thereby a desired speed ratio is obtained. Further, a hydraulic pressure sent to fluid passages not shown in the drawing is used for lubricating the belt 15 or other components.

Thus, according to this embodiment, since the communicating fluid passage 20 for connecting between fluid passages formed in the main case 3 and the side case 4 is integrally formed with the control valve body 6 mounted on the bottom of the transmission case 2, no such dedicated circuit as a lubrication pipe is needed to communicate between the aforesaid fluid passages. Further, since the fluid passages formed in both cases 3, 4 communicate with each other through the control valve body 6, the configuration of the fluid passages formed in both cases 3, 4 can be simplified and the fluid passages become easy to be cast.

Further, since a dedicated circuit is not necessary, the number of components can be reduced and the compact size of the continuously variable transmission can be realized.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A hydraulic circuit structure of an automatic transmission having an automatic transmission mechanism, a transmission case divided into a main case and at least one subsidiary case for accommodating said automatic transmission mechanism therein, a hydraulic actuator for actuating said automatic transmission mechanism, a first fluid passage formed in said main case for transmitting hydraulic pressure therethrough, a second fluid passage formed in said subsidiary case for transmitting hydraulic pressure therethrough and a control valve for controlling hydraulic pressure, comprising:

a control valve body including said control valve therein and mounted on a common mating surface formed by a bottom surface of said main case and said subsidiary case so as to close said bottom surface thereof; and a communicating passage formed in said control valve body for communicating between said first fluid passage and second fluid passage.

2. The hydraulic circuit structure according to claim 1, further comprising:

an O-ring provided around said second fluid passage at said mating surface between said subsidiary case and said control valve body.

3. The hydraulic circuit structure according to claim 1, wherein said communicating passage communicates with said control valve within said control valve body.

\* \* \* \* \*